US011019105B2

(12) United States Patent
Nakamura (10) Patent No.: US 11,019,105 B2
(45) Date of Patent: May 25, 2021

(54) COMMUNICATION APPARATUS, METHOD OF CONTROLLING THE SAME, PROGRAM, AND PRINTING APPARATUS

(71) Applicant: CANON KABUSHIKI KAISHA, Tokyo (JP)

(72) Inventor: Tadahiro Nakamura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/596,027

(22) Filed: Oct. 8, 2019

(65) Prior Publication Data
US 2020/0037164 A1    Jan. 30, 2020

Related U.S. Application Data

(63) Continuation of application No. 15/448,796, filed on Mar. 3, 2017, now Pat. No. 10,477,399, which is a
(Continued)

(30) Foreign Application Priority Data

Mar. 15, 2013    (JP) ................................. 2013-054144

(51) Int. Cl.
*H04W 12/08* (2021.01)
*H04W 48/00* (2009.01)
(Continued)

(52) U.S. Cl.
CPC .......... *H04L 63/205* (2013.01); *G06F 3/1222* (2013.01); *G06F 3/1236* (2013.01);
(Continued)

(58) Field of Classification Search
CPC .. H04L 63/205; H04L 63/10; H04W 12/0804; H04W 12/0808; H04W 48/00;
(Continued)

(56) References Cited

U.S. PATENT DOCUMENTS 8,495,706 B2 * 7/2013 Kanda ................. H04L 12/2829
726/2
8,640,193 B2 * 1/2014 Shigeeda ................ G06F 21/31
726/2
(Continued)

FOREIGN PATENT DOCUMENTS

JP    2008172555 A    7/2008
JP    2012199884 A    10/2012
(Continued)

OTHER PUBLICATIONS

Printer With Wired, Wireless and Other Features, and Associated Methods and Apparatus, 2005, Nov. 2005. (Year: 2005).*
(Continued)

*Primary Examiner* — Yonas A Bayou
(74) *Attorney, Agent, or Firm* — Rossi, Kimms & McDowell LLP (57) ABSTRACT

A communication apparatus determines whether or not a security function relating to communication of the communication apparatus is set when the information processing apparatus performs direct wireless communication; and controls to prohibit or permit wireless communication with the information processing apparatus in accordance with the determination result.

15 Claims, 10 Drawing Sheets

Related U.S. Application Data continuation of application No. 14/375,547, filed as application No. PCT/JP2014/055706 on Feb. 27, 2014, now Pat. No. 9,628,991.

(51) Int. Cl.

| | | |
|---|---|---|
| *H04L 29/06* | (2006.01) | |
| *G06F 3/12* | (2006.01) | |
| *G06F 21/60* | (2013.01) | |
| *H04W 12/084* | (2021.01) | |
| *H04W 12/088* | (2021.01) | |
| *H04W 76/14* | (2018.01) | |

(52) U.S. Cl.
CPC .......... *G06F 3/1292* (2013.01); *G06F 21/608* (2013.01); *H04L 63/10* (2013.01); *H04W 12/084* (2021.01); *H04W 12/088* (2021.01); *H04W 48/00* (2013.01); *H04W 76/14* (2018.02)

(58) Field of Classification Search
CPC .... G06F 3/1222; G06F 3/1236; G06F 3/1292; G06F 21/608
See application file for complete search history.

(56) References Cited

U.S. PATENT DOCUMENTS

| | | | | |
|---|---|---|---|---|
| 2005/0125692 A1* | 6/2005 | Cox | .................... | H04L 63/0272 726/4 |
| 2007/0008922 A1* | 1/2007 | Abhishek | .............. | H04W 72/02 370/329 |
| 2007/0171468 A1* | 7/2007 | Tanji | .................... | H04N 1/4433 358/1.15 |
| 2008/0212508 A1* | 9/2008 | Morimoto | ......... | H04W 52/0235 370/311 |
| 2009/0064281 A1* | 3/2009 | Esaka | ................. | H04L 63/0892 726/3 |
| 2009/0231618 A1* | 9/2009 | Akiyama | ........... | H04N 1/00127 358/1.15 |
| 2009/0307752 A1* | 12/2009 | Ohashi | .................... | H04L 63/08 726/3 |
| 2010/0281525 A1* | 11/2010 | Nakajima | .............. | H04W 48/14 726/5 |
| 2010/0299435 A1 | 11/2010 | Goto | | |
| 2011/0191817 A1* | 8/2011 | Oh | ........................ | G06F 21/608 726/1 |
| 2012/0244902 A1 | 9/2012 | Saito et al. | | |
| 2013/0039358 A1 | 2/2013 | Ejima | | |
| 2013/0133029 A1 | 5/2013 | Omori | | |
| 2013/0139228 A1* | 5/2013 | Odaira | .................. | G06F 21/608 726/5 |

FOREIGN PATENT DOCUMENTS

| | | |
|---|---|---|
| JP | 2013038724 A | 2/2013 |
| WO | 2010134182 A1 | 11/2010 |
| WO | 2012011264 A1 | 1/2012 |

OTHER PUBLICATIONS

Transparently Sharing Human Interface Devices Between Local and Remote Desktops, 2017. (Year: 2017).*
Internet Protocol-Based Remote to Control Set-Top Box (STB) Operations, 2011. (Year: 2011).*
Performance Enhancing Proxies Intended to Mitigate Link-Related Degradation (RFC 3135) (Year: 2001).*
International Search Report issued in Intl. Appln. No. PCT/JP2014/055706 dated May 27, 2014.
Written Opinion issued in Intl. Appln. No. PCT/JP2014/055706 dated May 27, 2014.
Office Action issued in U.S. Appl. No. 14/375,547 dated Jul. 21, 2016.
Notice of Allowance issued in U.S. Appl. No. 14/375,547 dated Dec. 16, 2016.
Office Action issued in U.S. Appl. No. 15/448,796 dated Jul. 28, 2017.
Office Action issued in U.S. Appl. No. 15/448,796 dated Dec. 26, 2017.
Office Action issued in U.S. Appl. No. 15/448,796 dated May 18, 2018.
Office Action issued in U.S. Appl. No. 15/448,796 dated Oct. 18, 2018.
Office Action issued in U.S. Appl. No. 15/448,796 dated Feb. 21, 2019.
Notice of Allowance issued in U.S. Appl. No. 15/448,796 dated Jul. 18, 2019.

* cited by examiner

COMMUNICATION APPARATUS, METHOD OF CONTROLLING THE SAME, PROGRAM, AND PRINTING APPARATUS

TECHNICAL FIELD

The present invention relates to a communication apparatus, a method of controlling the same, a program and a printing apparatus.

BACKGROUND ART

In communication apparatuses such as printing apparatuses, PCs, mobile terminals, and the like, it is possible to perform communication with an external apparatus via an access point by connecting to an access point as a client through a wireless LAN function. Also, a standard called Wi-Fi Direct (registered trademark) was established by The Wi-Fi Alliance. In Wi-Fi Direct, a protocol is defined for determining whether a communication apparatus, such as a printing apparatus or a PC, will operate as an access point or a client. By executing this protocol, the communication apparatus that becomes the access point, and the communication apparatus that becomes the client can be decided automatically. By using Wi-Fi Direct, it becomes unnecessary to prepare an access point separately, and it is possible to execute direct wireless communication between information processing apparatuses. In Japanese Patent Laid-Open No. 2012-199884, transmitting and receiving audio data, photograph data and the like using Wi-Fi Direct is disclosed.

However, there is a problem with the above described conventional technique as recited below. Printing apparatuses (communication apparatus) have come to have various security functions. As an example, there is a function called IP filter. IP filter is a function for restricting, by IP address, terminals for which wireless/wired access to a printing apparatus is permitted, and it is capable of preventing access by unauthorized terminals. Also, there is a function called MAC filter for restricting access by MAC address rather than IP address. A user maintains security for a network environment, which includes a printing apparatus, on the whole using various security functions that the printing apparatus has.

In cases where the user is using the above described security functions of the printing apparatus, there is the possibility that the user cannot maintain the security of the printing apparatus when an unspecified user connects and uses a mobile terminal and a printing apparatus by Wi-Fi Direct. For example, in the process of a Wi-Fi Direct connection, as described above, there are cases where an IP address is assigned automatically by DHCP to the mobile terminal. For this reason, even if terminals that are able to access are restricted by enabling IP filter on the printing apparatus, in cases where a permitted IP address is assigned to the mobile terminal, printing by a mobile terminal that was not intended to be permitted will be permitted. Conversely, even in cases where it is desired that Wi-Fi Direct usage be permitted, it cannot be used because access from mobile terminals is restricted by the security functions, and so there is a problem in that convenience is impaired.

SUMMARY OF INVENTION

The present invention enables realization of an arrangement for controlling suitably the security of a printing apparatus and the usage of wireless communication in cases where an information processing apparatus and a printing apparatus perform direct wireless communication.

One aspect of the present invention provides a communication apparatus operable to perform direct wireless communication with an information processing apparatus, the apparatus comprising: determination means for determining whether or not a security function relating to communication of the communication apparatus is set when the information processing apparatus performs the direct wireless communication; and control means for controlling, in accordance with a determination result of the determination means, whether to permit or to prohibit wireless communication with the information processing apparatus.

Another aspect of the present invention provides a communication apparatus, comprising: setting means for setting an IP filter to use in communication with an external apparatus; and communication mans for executing wireless communication for which a connection is established by distributing an IP address to an external apparatus, wherein in a case where the communication means executes the wireless communication, the communication apparatus does not use the IP filter set by the setting means.

Still another aspect of the present invention provides a method of controlling a communication apparatus operable to perform direct wireless communication with an information processing apparatus, the method comprising: determining whether or not a security function relating to communication of the communication apparatus is set when the information processing apparatus performs direct wireless communication; and controlling, in accordance with a determination result of the determination, whether to permit or to prohibit wireless communication with the information processing apparatus.

Yet still another aspect of the present invention provides a method of controlling a communication apparatus, the method comprising: setting an IP filter to use in communication with an external apparatus; and executing wireless communication for which a connection is established by distributing an IP address to an external apparatus, wherein in a case where the wireless communication is executed, the set IP filter is not used.

Still yet another aspect of the present invention provides a program for causing a computer to execute each step of the method of controlling a communication apparatus.

Further features of the present invention will be apparent from the following description of exemplary embodiments with reference to the attached drawings.

DESCRIPTION OF EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Wi-Fi Direct>

Figure 1:
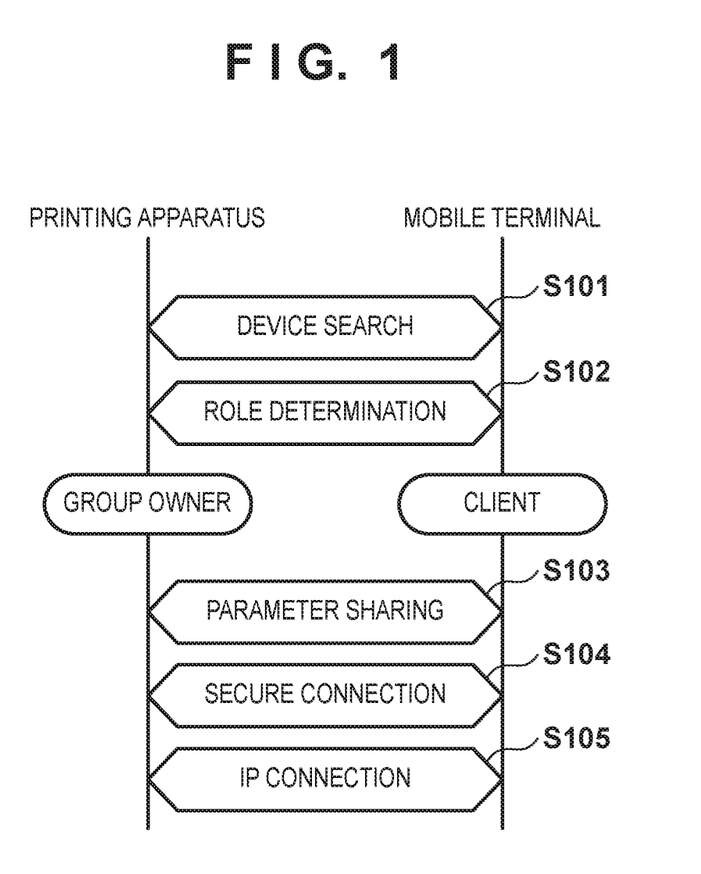
FIG. 1 is a view for illustrating a Wi-Fi Direct processing sequence.

Firstly, explanation will be given for a Wi-Fi Direct processing sequence with reference to FIG. 1. A printing apparatus and a mobile terminal are examples of an information processing apparatus or a communication apparatus that each support Wi-Fi Direct.

Firstly, in step S101, the printing apparatus and the mobile terminal each perform a device search in order to identify a communication partner. When a communication partner is identified by the device search, it is determined, in step S102, which will be the access point (GroupOwner) and which will be the Client (Client). The processing of step S102 is referred to as role determination. In FIG. 1, the result of the role determination of step S102 is that the printing apparatus becomes the GroupOwner, and the mobile terminal becomes the Client.

Next, in step S103, using WPS (Wi-Fi Protected Setup), which was established by The Wi-Fi Alliance, parameters for making a connection from the printing apparatus, which is the GroupOwner, to the mobile terminal, which is the Client, are provided. With this, the parameters are shared between the printing apparatus and the mobile terminal. Continuing on, in step S104, a secure connection is made using the parameters.

When the secure connection is completed, in step S105, addressing is performed in order to perform IP communication between the printing apparatus and the mobile terminal. Here, the printing apparatus, which is the GroupOwner, operates as a DHCP server, and grants an IP address to the mobile terminal, which is the Client.

By performing the above processing, wireless communication between the printing apparatus and the mobile terminal can be established. By using wireless communication, direct communication between the printing apparatus and the mobile terminal without preparing a separate access point becomes possible.

First Embodiment

Below, explanation will be given for a first embodiment of the present invention with reference to the drawings. The present embodiment prioritizes settings of a security function pertaining to communication of the printing apparatus (communication apparatus), and prohibits usage of Wi-Fi Direct in cases where predetermined settings pertaining to the security function are set.

<Configuration of the Printing Apparatus>

Figure 2:
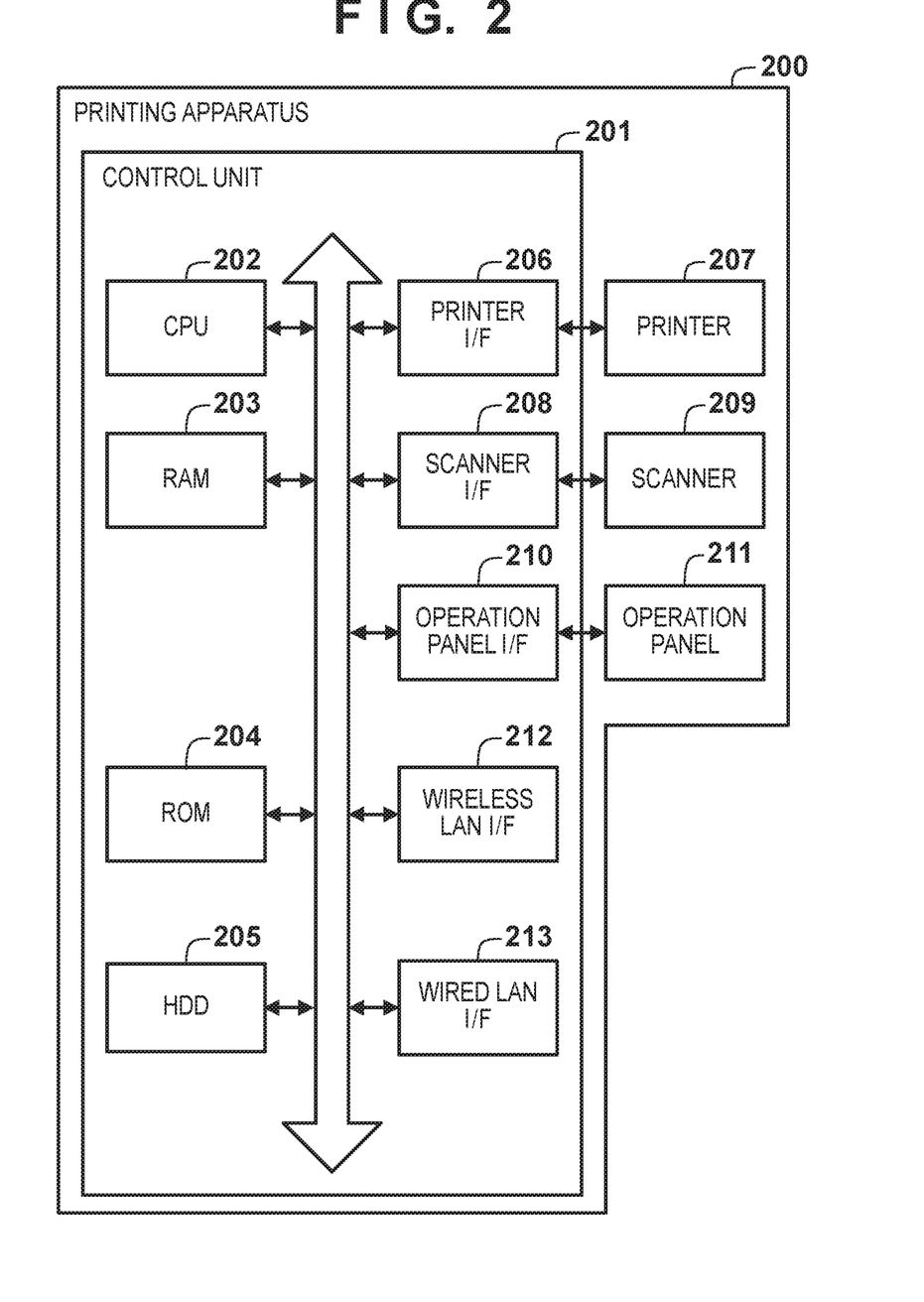
FIG. 2 is a view for illustrating a hardware configuration of a printing apparatus 200.

Next, explanation will be given for a hardware configuration of a printing apparatus 200 with reference to FIG. 2. The printing apparatus 200 is an example of an information processing apparatus or a communication apparatus capable of performing wireless communication with an external apparatus (for instance, a mobile terminal, a PC, or the like). In this embodiment, explanation is given having the printing apparatus 200 be a multi function peripheral, but a printer not provided with a scanner but having a communication function with an external apparatus may be used. Alternatively, a scanner not provided with a printer, but having a communication function with an external apparatus may be used. In other words, it is possible to adapt the present invention to a communication apparatus having a communication function with an external apparatus.

The printing apparatus 200 is provided with a control unit 201, a printer 207, a scanner 209 and a operation panel 211. The control unit 201 is provided with a CPU 202, a RAM 203, a ROM 204, an HDD 205, a printer I/F 206, a scanner I/F 208, a operation panel I/F 210, a wireless LAN I/F 212 and a wired LAN I/F 213.

The control unit 201, which includes the CPU 202, controls overall operations of the printing apparatus 200. The CPU 202 reads out a control program stored in the ROM 204 into the RAM 203, and performs various control such as communication control. The RAM 203 is a main memory of the CPU 202, and is used as a temporary region such as a work area. The HDD 205 stores data, various programs, or various information tables.

The printer I/F 206 connects the printer 207 (printing engine) and the control unit 201. The printer 207 performs a printing process on a sheet paper-fed from a paper feed cassette (not shown) based on print data input via the printer I/F 206. The scanner I/F 208 connects the scanner 209 and the control unit 201. The scanner 209 generates image data by scanning a stacked original and outputs. Image data output from the scanner 209 is printed by the printer 207, stored in the HDD 205, and transmitted to an external apparatus via the wireless LAN I/F 212, the wired LAN I/F 213, or the like.

The operation panel I/F 210 connects the operation panel 211 and a control unit 201. The operation panel 211 is provided with a liquid crystal display unit having a touch panel function, a keyboard, various function keys, or the like. A user confirms a screen displayed on the operation panel 211, and is capable of inputting various instructions to the printing apparatus 200 using the touch panel.

The wireless LAN I/F 212 executes wireless communication with an external apparatus such as a mobile terminal, a PC, or the like. By this wireless communication, the printing apparatus 200 receives print data from an external apparatus, and the printer 207 performs a printing process based on the received print data. Also, image data that the scanner 209 generates may be transmitted to an external apparatus via the wireless LAN I/F 212. The wired LAN I/F 213 is connected to a LAN cable (not shown), and is capable of performing communication with an external apparatus.

Note, the printing apparatus 200 is something that executes the processing shown in the later explained flowcharts using a single CPU 202, and a single memory (RAM 203), but other embodiments may be taken. For instance, configuration may be taken such that the processing shown in later explained flowcharts is executed by coordinating a plurality of CPUs and a plurality of memories.

<Configuration of the Mobile Terminal>

Figure 3:
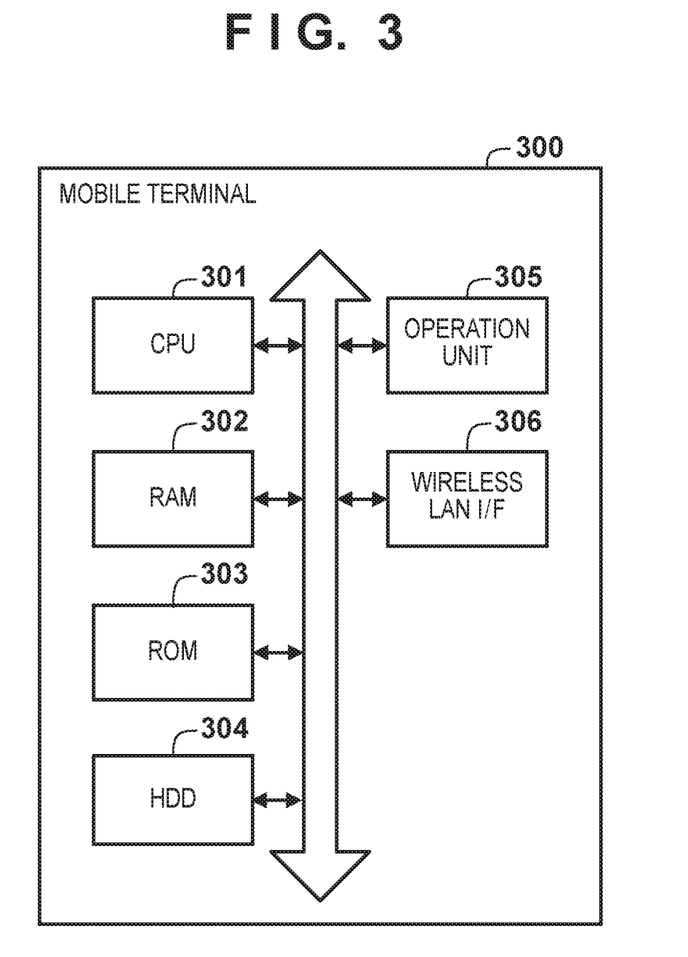
FIG. 3 is a view for illustrating a hardware configuration of a mobile terminal 300.

Next, explanation will be given for a hardware configuration of the mobile terminal 300 with reference to FIG. 3. The mobile terminal 300, similarly to the printing apparatus 200, is an example of an information processing apparatus capable of performing wireless communication. The mobile terminal 300 is an apparatus such as a smart phone, a mobile telephone, a tablet, a digital camera, or the like, for example.

The mobile terminal 300 is provided with a CPU 301, a RAM 302, a ROM 303, an HDD 304, an operation unit 305, and a wireless LAN I/F 306. The CPU 301 reads out a control program stored in the ROM 303 into the RAM 302, and controls overall operations of the mobile terminal 300. The RAM 302 is a main memory of the CPU 301, and is used as a temporary region such as a work area. The HDD 304 stores data, various programs, or various information tables.

The operation unit 305 is constituted by a liquid crystal display unit having a touch panel function, hard keys, or the like. A user confirms a screen displayed on the operation unit 305, and is capable of inputting various instructions to the printing apparatus 200 using the touch panel. The wireless LAN I/F 306 performs wireless communication with an external apparatus such as the printing apparatus 200. The wireless LAN I/F 306 is capable of transmitting to the printing apparatus 200 image data, as print data, stored in a memory such as the HDD 304, for instance.

Note, the mobile terminal 300 is something that executes the processing shown in later explained flowcharts using a single CPU 301, and a single memory (RAM 302), but other embodiments may be taken. For instance, configuration may be taken such that the processing shown in later explained flowcharts is executed by coordinating a plurality of CPUs and a plurality of memories.

<Operation Screens>

Figure 4:
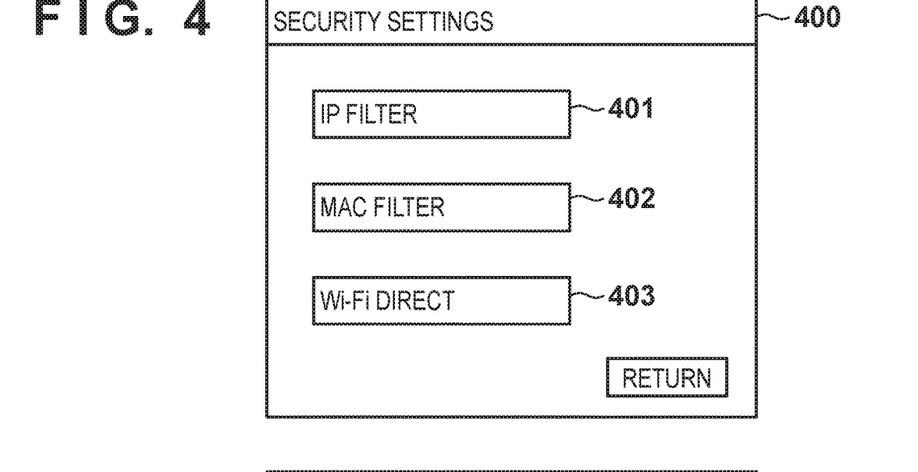
FIG. 4 is a view for illustrating a security setting screen displayed on a operation panel 211.

Next, explanation will be given for operation screens displayed on the operation panel 211 of the printing apparatus 200, with reference to FIG. 4-FIG. 6. An operation screen 400 shown in FIG. 4 is a screen on which a user performs security setting of the printing apparatus 200. On the operation screen 400 are included icons 401-403. The icon 401, the icon 402, and the icon 403 are setting icons for IP filter, MAC filter, and Wi-Fi Direct, respectively. In the operation screen 400, the icons 401-403 of the security functions usable on the printing apparatus 200 are displayed, and the user, by pressing the icons, may set the respective functions.

Figure 5:
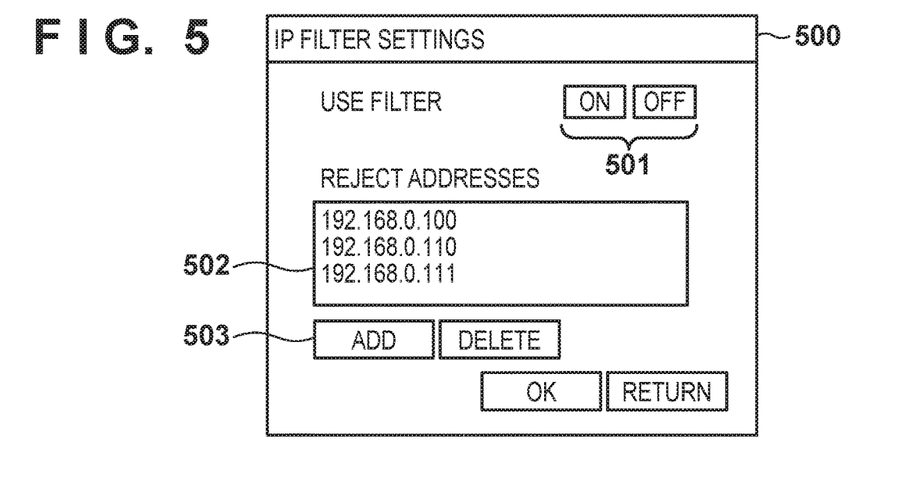
FIG. 5 is a view for illustrating an IP filter setting screen displayed on a operation panel 211.

In the operation screen 400, when the user selects the icon 401, transition is made to an operation screen 500 shown in FIG. 5, and an IP filter setting screen is displayed. An icon 501 sets whether or not IP filter is used. In cases where the icon 501 is ON, IP filter is enabled, and access from IP addresses registered in reject addresses 502 is rejected. For the reject addresses, it is possible to register multiple IP addresses by selecting an icon 503.

Figure 6:
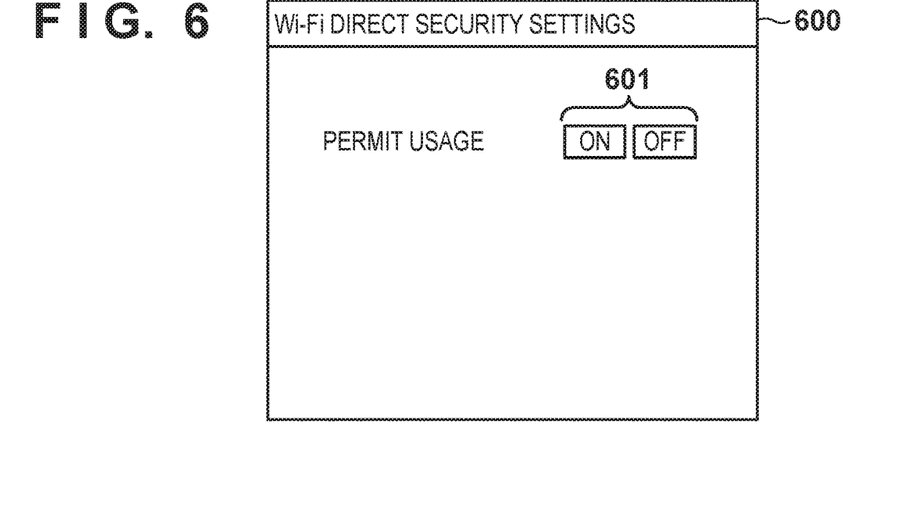
FIG. 6 is a view for illustrating a Wi-Fi Direct security setting screen displayed on a operation panel 211.

When the user selects the icon 403 from the screen of FIG. 4, transition is made to a operation screen 600 of FIG. 6, and a Wi-Fi Direct security setting screen is displayed. An icon 601 sets whether to permit or to prohibit a Wi-Fi Direct connection.

<Wireless Connection Processing>

Figure 7:
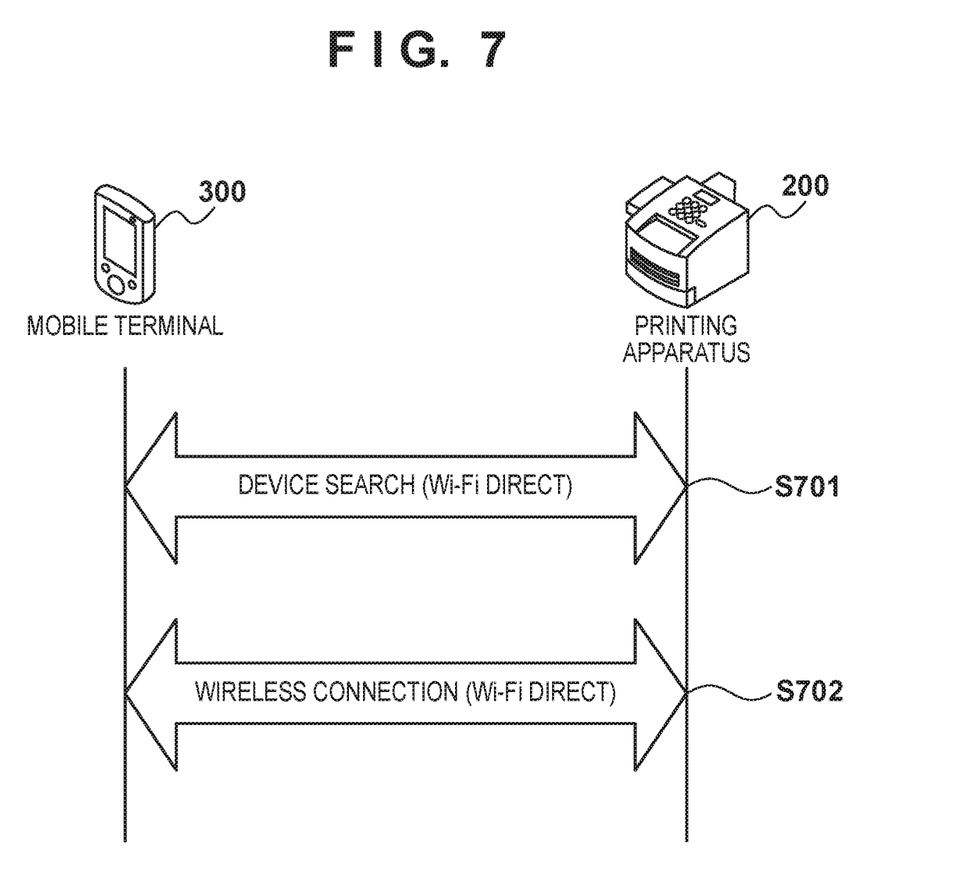
FIG. 7 is a sequence diagram for showing processing executed between a printing apparatus 200 and a mobile terminal 300.

Next, explanation will be given for wireless connection processing of a printing system according to the embodiment with reference to FIG. 7. In this embodiment, the printing apparatus 200 and the mobile terminal 300 execute Wi-Fi Direct wireless communication as explained with FIG. 1. When a user makes an instruction for execution initiation of Wi-Fi Direct on each of the printing apparatus 200 and the mobile terminal 300, the printing apparatus 200 and the mobile terminal 300 respectively execute a device search as shown in step S701. By the device search the printing apparatus 200 and the mobile terminal 300 are able to identify each other as a communication partner. Note, in step S701 the processing explained in step S101 of FIG. 1 is executed.

Figure 8:
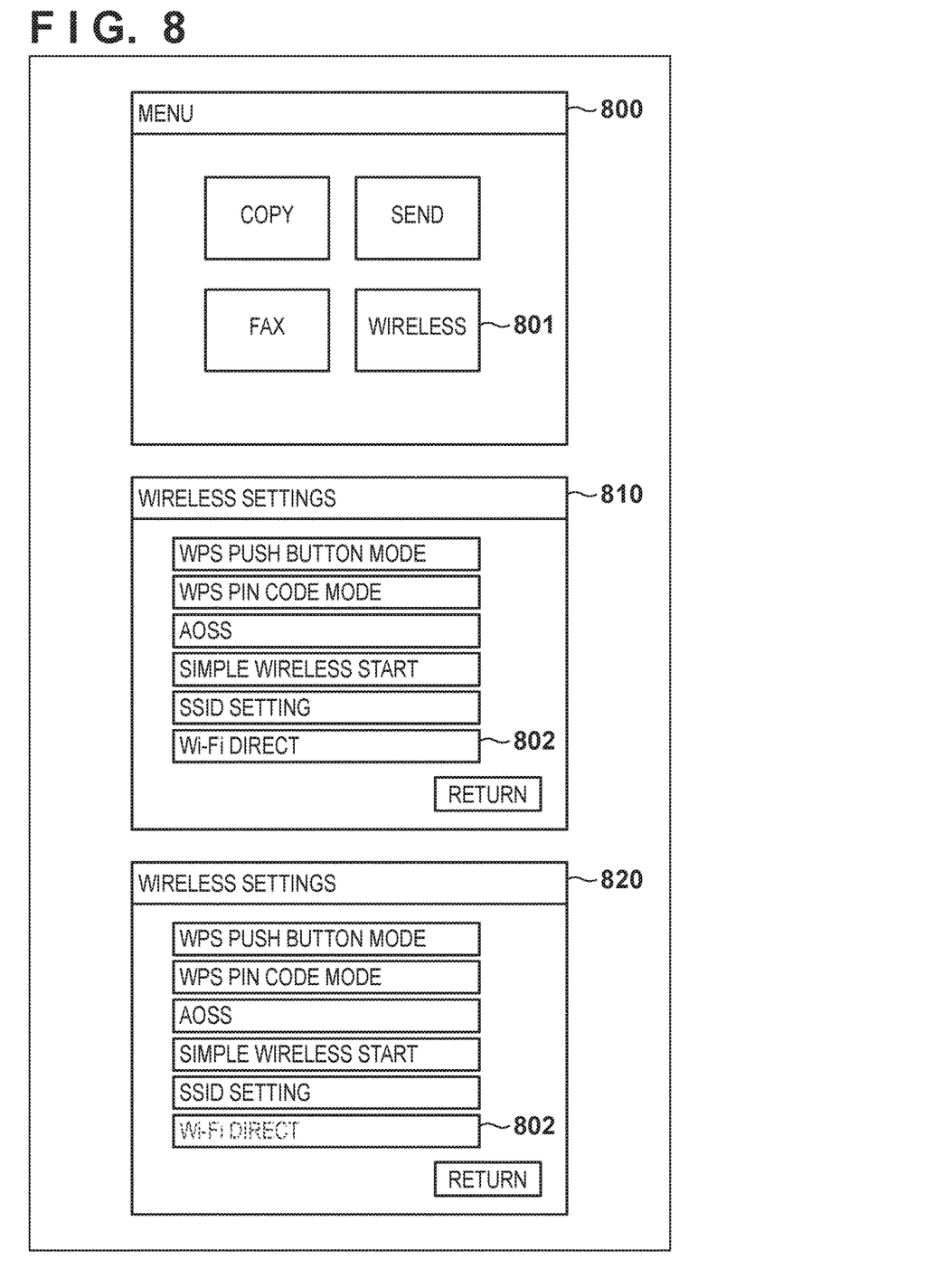
FIG. 8 is a view for illustrating a screen displayed on a operation panel 211.

In this embodiment, a user makes an instruction for execution initiation of Wi-Fi Direct through a screen displayed on the printing apparatus 200 or the mobile terminal 300. An operation screen 800 of FIG. 8 is a screen displayed on the operation panel 211 of the printing apparatus 200, and it is a basic operation window for a user to select a function to use from out of a plurality of functions that the printing apparatus 200 provides. A user can use a wireless function of the printing apparatus 200 by the user selecting an icon 801.

Figure 9:
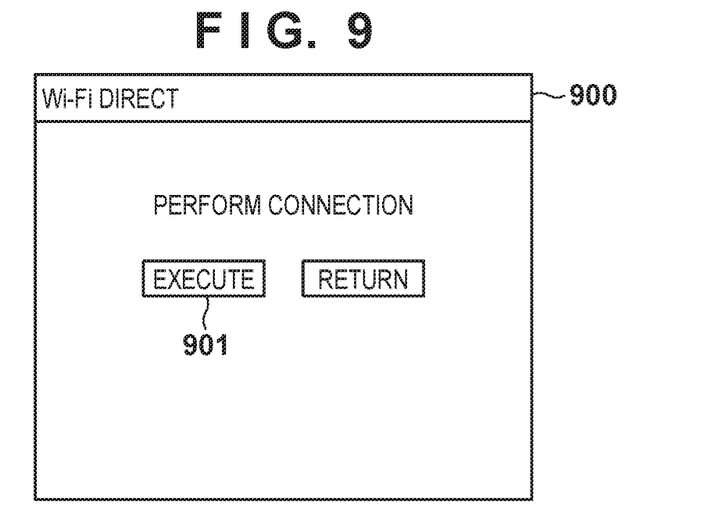
FIG. 9 is a view for illustrating a Wi-Fi Direct connection instruction screen displayed on a operation panel 211.

When a user selects the icon 801, an operation screen 810 or an operation screen 820 is displayed on the operation panel. In the operation screens 810 and 820 various settings pertaining to wireless communication settings are possible. As will be explained later, there are cases where an icon 802 is displayed normally as in the operation screen 810, and displayed grayed out as in the operation screen 820, and when a user selects the icon 802 in cases where it is displayed normally, a screen 900 of FIG. 9 is displayed on the operation panel 211. Then, by the user selecting an icon 901, wireless communication (Wi-Fi Direct) execution initiation is instructed. Note, in the operation unit 305 of the mobile terminal 300 the same screen is displayed as in FIG. 9, and the user is able to instruct wireless communication (Wi-Fi Direct) execution initiation.

When the printing apparatus 200 and the mobile terminal 300 identify each other as a communication partner with the device search of step S701, a wireless connection as shown in step S702 is executed. With the wireless connection of step S702 wireless communication between the printing apparatus 200 and the mobile terminal 300 is established. Note, in step S702, the processing explained in steps S102-S105 of FIG. 1 is executed.

More specifically, it is first determined which of the printing apparatus 200 and the mobile terminal 300 will be the access point (GroupOwner) and which will be the Client (Client). Continuing on, parameters are shared between the printing apparatus 200 and the mobile terminal 300 using WPS, and a secure connection is performed using these parameters. When the secure connection is completed, addressing is performed in order to perform IP communication between the printing apparatus 200 and the mobile terminal 300. Here, the apparatus, which is the GroupOwner, grants an IP address to the apparatus which is the Client. By executing this wireless connection, wireless communication between the printing apparatus 200 and the mobile terminal 300 is established.

Figure 10:
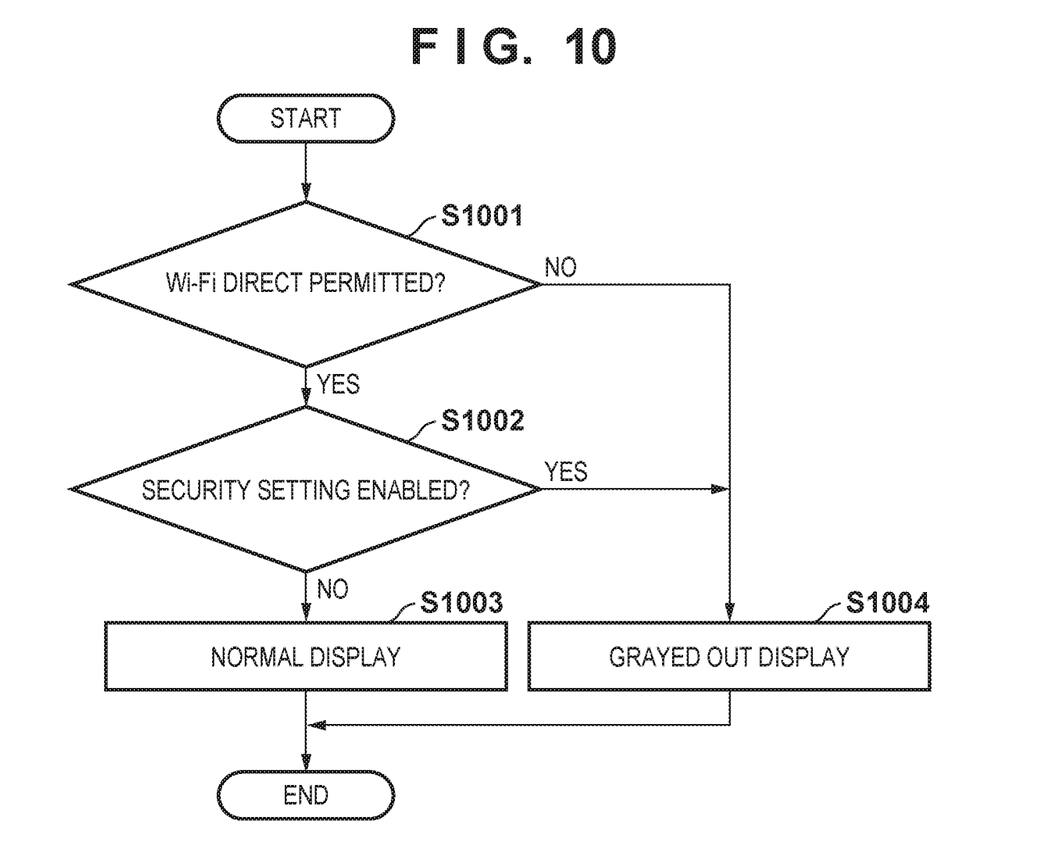
FIG. 10 is a flowchart for showing processing for determining a display state of an icon 802.

Whether the icon 802 is displayed normally or displayed grayed out is determined by the flowchart of FIG. 10. The steps shown in the flowchart of FIG. 10 are processed by the CPU 202 loading into the RAM 203 and executing a program stored in a memory such as the ROM 204.

In step S1001, the CPU 202 determines whether or not usage of Wi-Fi Direct is permitted. Here the determination is performed based on the setting value set with the icon 601 of FIG. 6. If permitted, the processing proceeds to step S1002, and the CPU 202 determines whether or not each security setting is enabled. In cases where, according to the determination result, the security settings are all disabled, the processing proceeds to step S1003, and the CPU 202 determines to display the icon 802 normally.

On the other hand, in cases where, in step S1001, Wi-Fi Direct is not permitted, or in cases where any of the security settings in step S1002 are enabled, the processing proceeds to step S1004, and the CPU 202 determines to display the icon 802 grayed out. In other words, the CPU 202 displays the icon 802 grayed out, and by making it unselectable, prohibits Wi-Fi Direct with an external apparatus.

As explained above, by virtue of the present embodiment, the printing apparatus 200 prohibits Wi-Fi Direct with the mobile terminal 300 in cases where any of the security settings that the printing apparatus 200 has are enabled. Accordingly, security set for the printing apparatus 200 is maintained, and unauthorized access can be prevented.

<Variation>

Note, the present invention is not limited to the above described embodiment, and various variations are possible. For instance, in the above described embodiment, configuration is taken in which, in cases where a predetermined security setting is enabled in the printing apparatus 200, usage of Wi-Fi Direct is prohibited. However, configuration may be taken in which usage of Wi-Fi Direct is prioritized. In such a case, in step S1002 of FIG. 10, in cases where a security setting is enabled, the security setting is temporarily changed to be disabled, and transition is made to the processing of step S1003. Here, current security settings are stored in a memory such as the RAM 203. After that, when the usage of Wi-Fi Direct completes, by referencing the information stored in the memory, the security setting that was temporarily disabled is re-enabled.

Second Embodiment

Next explanation will be given for a second embodiment of the present invention. The above described first embodiment is explained as a configuration in which, in cases where a security setting of the printing apparatus 200 is enabled, a Wi-Fi Direct connection between the printing apparatus 200 and an external apparatus is not allowed to be performed. However, in the above described first embodiment, it is not possible to do such a thing as permit Wi-Fi Direct temporarily in place of being able to firmly maintain security. Also, in the variation in the above described first embodiment, while the usage of Wi-Fi Direct can be performed flexibly, compared to the above described first embodiment, security is vulnerable. In this embodiment, configuration is taken such that an administrator, or the like is able to set whether to prioritize security or Wi-Fi Direct usage. Note, because the configurations of the printing apparatus 200 and the mobile terminal 300, and the wireless connection processing sequence of the printing system are similar configurations to those of the above described the first embodiment, explanation is omitted.

Figure 11:
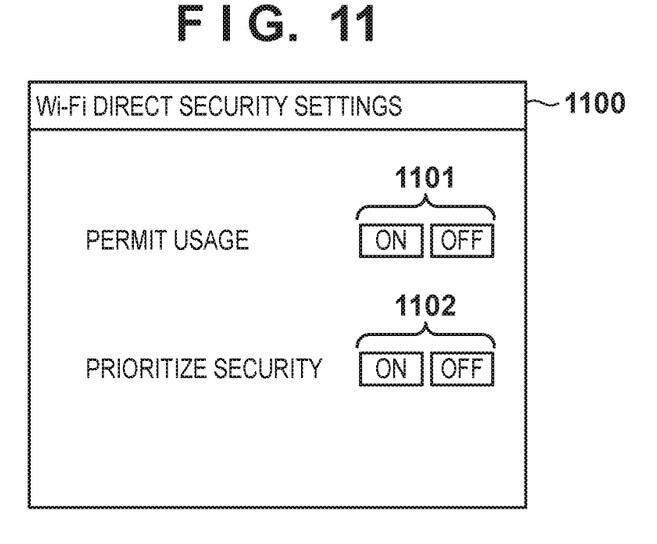
FIG. 11 is a view for illustrating a Wi-Fi Direct security setting screen displayed on a operation panel 211.

Firstly, explanation will be given for a setting screen 1100 displayed on the operation panel 211 of the printing apparatus 200 in the present embodiment with reference to FIG. 11. The setting screen 1100 is a Wi-Fi Direct security setting screen displayed in cases where a user selects the icon 403 on the operation screen 400 of FIG. 4. An icon 1101 sets whether to permit or to prohibit a Wi-Fi Direct connection. An icon 1102 sets whether or not to prioritize security, and when the usage of Wi-Fi Direct is permitted in cases where it is OFF, even if security settings are made, the security settings are temporarily disabled, and it is possible to use Wi-Fi Direct. On the other hand, in cases where it is ON, similarly to the above described first embodiment, if security settings are enabled, usage of Wi-Fi Direct is prohibited.

Note, performing display control in consideration of a relationship between the above described icon 1101 and icon 1102 is advantageous. For instance, when a user sets permit Wi-Fi Direct usage with the icon 1101, control may be taken such that setting of the icon 1102 becomes selectable. In such cases, display control may be performed so that the icon 1102 is displayed to be unselectable, or displayed grayed out, or not displayed, until the user sets permit Wi-Fi Direct usage with the icon 1101.

Figure 12:
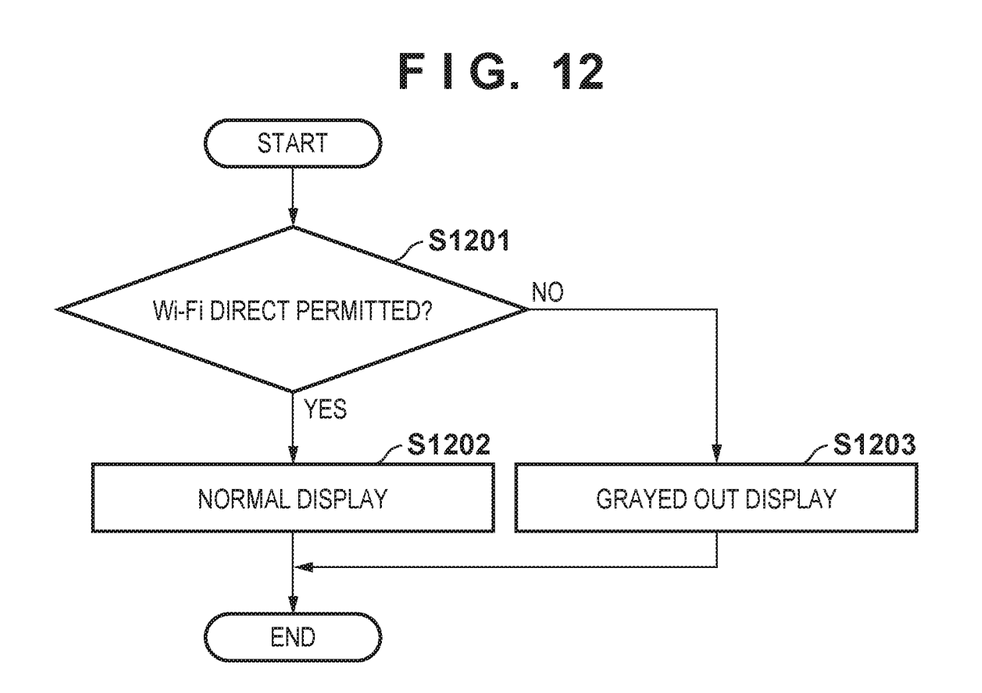
FIG. 12 is a flowchart for showing processing for determining a display state of an icon 802.

When the user selects an icon 801 on the operation screen 800, the operation screen 810 or the operation screen 820 is displayed, and whether the icon 802 is displayed normally or displayed grayed out is determined by the flowchart of FIG. 12.

The steps shown in the flowchart of FIG. 12 are processed by the CPU 202 loading into the RAM 203 and executing a program stored in a memory such as the ROM 204.

In step S1201, the CPU 202 determines whether or not the usage of Wi-Fi Direct is permitted. Here, determination is performed based on a setting value set with the icon 1101 of FIG. 11. In cases where it is permitted, the processing proceeds to step S1202, and the CPU 202 determines to display normally the icon 802. In step S1201, in cases where it is not permitted, the processing proceeds to step S1203, and the CPU 202 determines to display the icon 802 grayed out.

When the user selects the icon 802 in cases where the icon 802 is displayed normally, the screen 900 of FIG. 9 is displayed on the operation panel 211. Then, when wireless communication (Wi-Fi Direct) execution initiation is instructed by the user selecting the icon 901 on the screen 900, the printing apparatus 200 executes the processing of FIG. 13.

Figure 13:
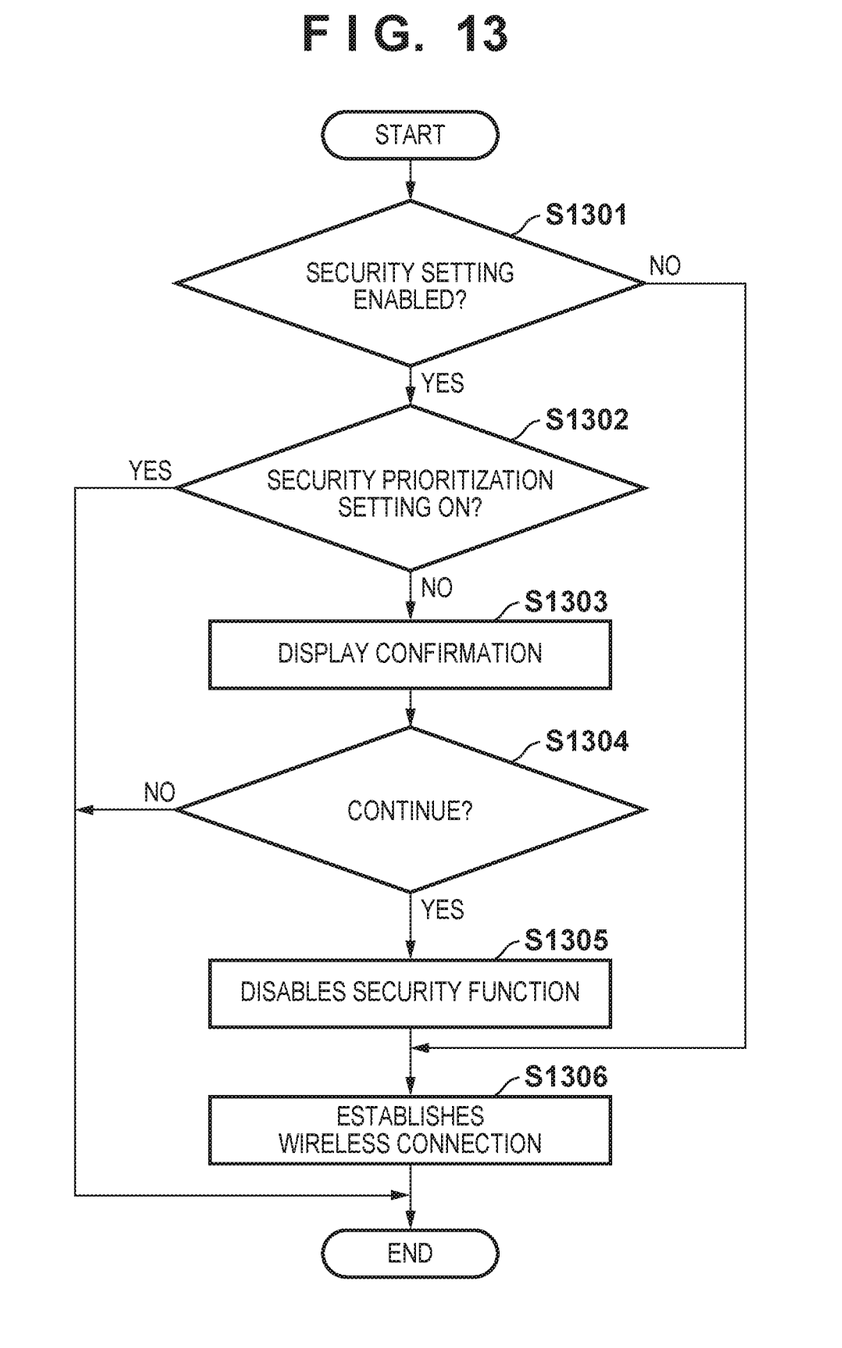
FIG. 13 is a flowchart for showing processing is executed when the printing apparatus 200 receives a wireless communication initiation instruction.

FIG. 13 is a flowchart for showing processing executed when the printing apparatus 200 receives a wireless communication initiation instruction. The steps shown in the flowchart of FIG. 13 are processed by the CPU 202 loading into the RAM 203 and executing a program stored in a memory such as the ROM 204.

Figure 14:
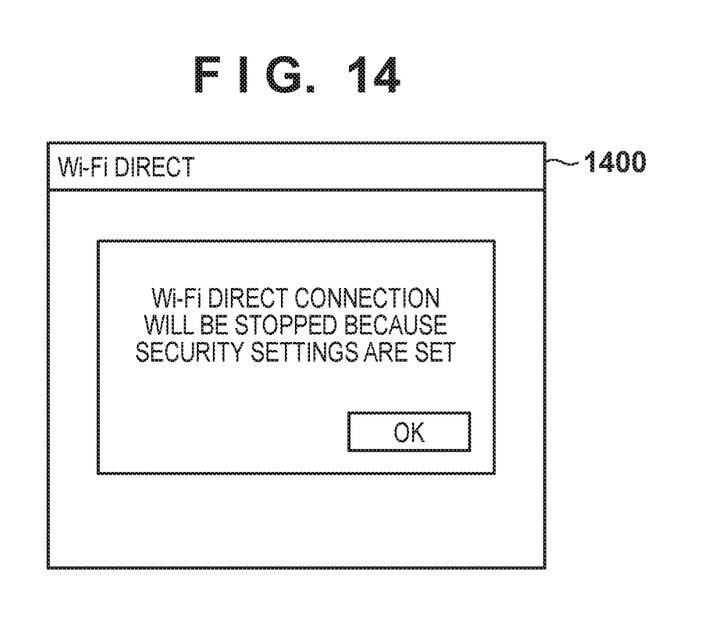
FIG. 14 is a view for illustrating a screen displayed on a operation panel 211.

When the user makes an instruction for wireless communication initiation in the printing apparatus 200, the CPU 202, in step S1301, determines whether or not any of the security settings of the printing apparatus 200 are enabled. In cases where any of the security settings are enabled, the processing proceeds to step S1302, the CPU 202 determines whether or not a security prioritizing setting set with the icon 1102 is ON. In cases where the security prioritizing setting is ON, a screen such as that in FIG. 14 is displayed, and the processing completes. A screen 1400 is a notification screen for notifying the user that usage of Wi-Fi Direct will be stopped because security settings are set.

Figure 15:
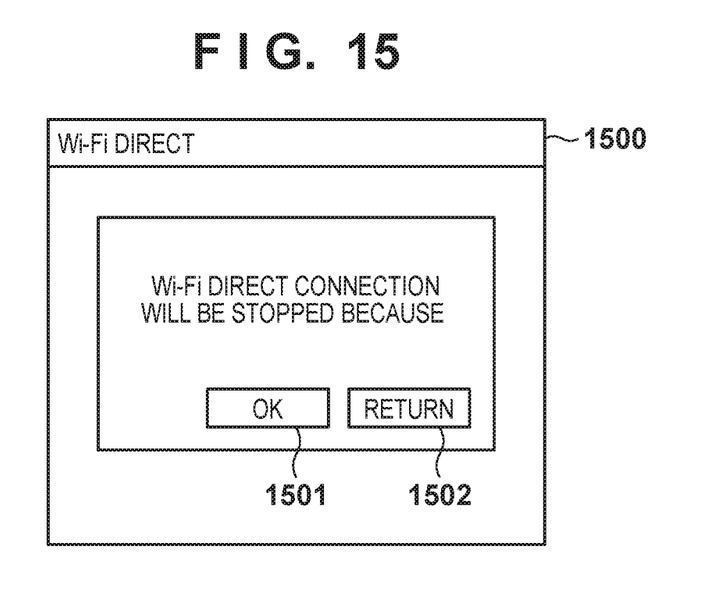
FIG. 15 is a view for illustrating a screen displayed on a operation panel 211.

Meanwhile, in cases where a security prioritizing setting is OFF, the processing proceeds to step S1303, and the CPU 202 displays a screen such as that of FIG. 15 on the operation panel 211. A screen 1500 is a screen for querying an operator as to whether or not to temporarily disable security settings in order to use Wi-Fi Direct. In the screen 1500, when a user selects an icon 1501, a continue instruction is performed, and when an icon 1502 is selected, a cancel instruction is performed.

In step S1304, the CPU 202 determines the user instruction content via the screen 1500, and the processing completes in cases where there is a cancel instruction. Meanwhile, in cases where there is a continue instruction, the processing proceeds to step S1305, and the CPU 202 disables each security function temporarily. Here, current security settings are stored in a memory such as the RAM 203. With this, it is possible to restore security settings when later the Wi-Fi Direct connection ends. After this, in step S1306, the CPU 202 performs the processing explained in steps S701-S702 of FIG. 7, and establishes a wireless connection. Also, in step S1301, in cases where the security settings are all disabled, the processing proceeds to step S1306, and a wireless connection is established.

As explained above, by virtue of the present embodiment, when Wi-Fi Direct is used, an operator, or the like, is able to switch whether or not to prioritize security settings of the printing apparatus 200. In cases where security settings are prioritized, the usage of Wi-Fi Direct is prohibited, and in a case where the usage of Wi-Fi Direct is prioritized, if security settings are set, the security settings are temporarily disabled, and it becomes possible to use the Wi-Fi Direct function. With this, in the present embodiment, it is possible to control by determining a priority of the security of the printing apparatus and user convenience, in cases where a mobile terminal and a printing apparatus perform direct wireless communication.

Other Embodiments

In the above described embodiment, explanation was given with IP filter as an example of a security function that the printing apparatus 200 has, but the security function is not limited to IP filter. For example, it is possible to apply the present invention for various security functions that the printing apparatus 200 has, such as a MAC filter, IEEE 802.1X, IPsec, or the like. Also, in the above described embodiment, explanation was given for the printing apparatus 200 and the mobile terminal 300 executing Wi-Fi Direct as the wireless communication, but the wireless communication is not limited to Wi-Fi Direct. It is possible to apply the present invention if the wireless communication is such that a plurality of communication apparatuses are able to perform direct communication, such as with Wi-Fi Direct.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

With the present invention, in cases where an information processing apparatus and a communication apparatus perform direct wireless communication, an arrangement for controlling suitably the security of the communication apparatus and the usage of the wireless communication can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-054144 filed on Mar. 15, 2013, which is hereby incorporated by reference herein in its entirety.

The invention claimed is:

1. A printing apparatus having a Wireless Fidelity ("Wi-Fi") Direct function that is capable of performing direct wireless communication with an external apparatus via a Wi-Fi Direct network, the printing apparatus capable of communicating with an external apparatus via a local area network different from the Wi-Fi Direct network, and the printing apparatus comprising:
   a printer;
   at least one memory that stores instructions; and
   at least one processor that executes the instructions to:
      set an Internet Protocol ("IP") address filter; and
      control the printing apparatus to establish a connection for wireless communication with an external apparatus by the Wi-Fi Direct function, regardless of the set IP address filter.

2. The printing apparatus according to claim 1, further comprising:
   a display that displays a setting screen for a user to set the IP address filter.

3. The printing apparatus according to claim 1, wherein the IP address filter is a setting for restricting an access to the printing apparatus based on an IP address.

4. The printing apparatus according to claim 1, wherein the IP address filter is a setting for denying an access to the printing apparatus by an external apparatus having a specific IP address.

5. The printing apparatus according to claim 1,
   wherein the at least one processor executes the instructions to:
   control the printing apparatus to establish an IP connection with the external apparatus for the wireless communication after the connection for the wireless communication is established,
   wherein, even if an IP address allocated to the external apparatus by the Wi-Fi Direct function coincides with an IP address set for the IP address filter as a target of reception rejection, the wireless communication with the external apparatus using the allocated IP address is performed.

6. The printing apparatus according to claim 1, wherein a communication with an external apparatus on the local area network is controlled based on the set IP address filter.

7. The printing apparatus according to claim 1, wherein establishing the connection for the wireless communication includes establishing a secure connection which uses a Wi-Fi Protected Setup method.

8. The printing apparatus according to claim 1, wherein the printing apparatus functions as a Dynamic Host Configuration Protocol ("DHCP") server and assigns an IP address to an external apparatus that has established a connection to the printing apparatus for the direct wireless communication via the Wi-Fi Direct network.

9. A printing apparatus having a Wireless Fidelity ("Wi-Fi") Direct function that is capable of performing direct wireless communication with an external apparatus via a Wi-Fi Direct network, the printing apparatus capable of communicating with an external apparatus via a local area network different from the Wi-Fi Direct network, and the printing apparatus comprising:
   a printer;
   at least one memory that stores instructions; and
   at least one processor that executes the instructions to:
      set whether to use an Internet Protocol ("IP") address filter; and
      control the printing apparatus to perform a wireless communication with an external apparatus by the Wi-Fi Direct function without using the IP address filter even if using the IP address filter has been set.

10. The printing apparatus according to claim 9, further comprising:
   a display that displays a setting screen for a user to set whether to use the IP address filter.

11. The printing apparatus according to claim 9, wherein the IP address filter is a setting for restricting an access to the printing apparatus based on an IP address.

12. The printing apparatus according to claim 9, wherein the IP address filter is a setting for denying an access to the printing apparatus by an external apparatus having a specific IP address.

13. The printing apparatus according to claim 9, wherein, if using the IP address filter has been set, the IP address filter is applied to communication with an external apparatus on the local area network other than the Wi-Fi Direct network.

14. A method of controlling a printing apparatus having a Wireless Fidelity ("Wi-Fi") Direct function that is capable of performing direct wireless communication with an external apparatus via a Wi-Fi Direct network, the printing apparatus capable of communicating with an external apparatus via a local area network different from the Wi-Fi Direct network, and the method comprising:
   setting an Internet Protocol ("IP") address filter; and
   establishing a connection for wireless communication with an external apparatus by the Wi-Fi Direct function, regardless of the set IP address filter.

15. A method of controlling a printing apparatus having a Wireless Fidelity ("Wi-Fi") Direct function that is capable of performing direct wireless communication with an external apparatus via a Wi-Fi Direct network, the printing apparatus capable of communicating with an external apparatus via a local area network different from the Wi-Fi Direct network, and the method comprising:
   setting whether to use an Internet Protocol ("IP") address filter; and
   performing a wireless communication with an external apparatus by the Wi-Fi Direct function without using the IP address filter even if using the IP address filter has been set.

\* \* \* \* \*